FOLDABLE WALKWAY AND STORAGE APPARATUS THEREFOR

Filed March 10, 1958 4 Sheets-Sheet 1

INVENTORS
CLAIR W. TELLEFSON
CHARLES E. SMITH
MELVIN E. NELSON

By R. E. Geauque
Attorney

July 31, 1962 C. W. TELLEFSON ET AL 3,046,850

FOLDABLE WALKWAY AND STORAGE APPARATUS THEREFOR

Filed March 10, 1958 4 Sheets-Sheet 2

INVENTORS
CLAIR W. TELLEFSON
CHARLES E. SMITH
MELVIN E. NELSON

By R. E. Geauque
Attorney

FOLDABLE WALKWAY AND STORAGE APPARATUS THEREFOR

Filed March 10, 1958 4 Sheets-Sheet 3

INVENTORS
CLAIR W. TELLEFSON
CHARLES E. SMITH
MELVIN E. NELSON
By R. E. Geauque
Attorney July 31, 1962 C. W. TELLEFSON ET AL 3,046,850

FOLDABLE WALKWAY AND STORAGE APPARATUS THEREFOR

Filed March 10, 1958 4 Sheets-Sheet 4

INVENTORS
CLAIR W. TELLEFSON
CHARLES E. SMITH
MELVIN E. NELSON

By R. E. Geauque
Attorney

United States Patent Office 3,046,850

Patented July 31, 1962

3,046,850

FOLDABLE WALKWAY AND STORAGE APPARATUS THEREFOR

Clair W. Tellefson, 1067 E. Mountain Drive, Santa Barbara, Calif.; Charles E. Smith, 1333 E. Mountain Drive, Montecito, Calif.; and Melvin E. Nelson, 2450 Sycamore Canyon Road, Santa Barbara, Calif.

Filed Mar. 10, 1958, Ser. No. 720,462
5 Claims. (Cl. 94—1)

This invention relates to passenger handling equipment and relates more particularly to a foldable walkway which may be automatically laid upon the ground and picked up therefrom via a storage apparatus.

The difficulty of efficiently loading and unloading passengers from commercial vehicles, such as aircraft, trains and busses, for example, has been recognized for a number of years. The recent steady increase in both the size of vehicles and the volume of passenger travel has brought the problem to a critical state. At present, vehicles after arriving at a terminal are maneuvered to an assigned loading or unloading zone. Generally, unloading passengers leave the vehicle and proceed to one of several gates leading into the terminal. Passengers waiting to board the parked vehicles may then pass through respective gates and board the desired vehicle.

Difficulties have been encountered under the circumstances described since some passengers may inadvertently enter certain gates or vehicles by mistake. Therefore, there has long existed a need for a portable walkway which may be arranged to connect a particular gate or area with a particular vehicle. It is necessary that the walkway be portable so that the vehicle need not be required to be maneuvered to an exact position with respect to the loading and unloading area for every departure or arrival of a vehicle. Furthermore, once the vehicle has departed the loading and unloading area can be employed for other purposes, in which case, the walkway may be removed to facilitate other operations.

Some attempts have been made in the past to provide guide means for directing passenger traffic, such as applying painted stripes on the walking surface, manually stringing chains or rope between portable stanchions, and in some instances laying carpeting from the terminal gate to the door of the vehicle.

It is obvious that the painting of guide lines is not suitable for portable operation and that the laying of chains or rope between stanchions is time and space consuming. In the case of the employment of carpeting, it is customary to unroll the carpet upon the arrival of passengers, followed by rolling the carpet into a compact roll for storage until the next use. In such use of the carpet dirt, debris and other foreign matter collects on the underside of the carpet and is deposited upon the top of the carpet which causes stains and other damage to the carpet. Some commercial vehicle operators employ a particularly high grade carpeting of a predetermined color, such as red for example, which is employed on what the operators consider to be first-class flights or runs. Therefore, it is important to these operators that the carpeting be as clean as possible at all times and that the appearance of the carpeting be void of unsightly stains and collections of dirt.

The above difficulties are obviated by the present invention in which a foldable walkway is provided which comprises in general a plurality of carpeted panels arranged in an end to end relationship and pivotally connected together. The panels carry a plurality of fixed stanchions and a flexible cord or chain for guide purposes. The carpeted panels are foldably arranged so that the underside of the panels, engageable with the pavement or ground, never come in contact or engagment with the carpeting of adjacent panels when the walkway is in its folded or stowed condition. Each panel of the walkway is further provided with two sets of roller attachments which are engageable with separate tracking means carried on a stowage cart. The sets of rollers and the tracking means are constructed so that the walkway may be readily unfolded from its stowed position on the cart to its laid out or extended position on the pavement or ground and so that the walkway may be readily picked up from the pavement or the ground and folded within the stowage cart. Therefore, a primary feature of the present invention resides in the fact that the portable walkway may be quickly and easily laid in an extended position upon the arrival of a commercial vehicle for passenger loading and unloading purposes and may be quickly and easily picked up and stowed upon the departure of the vehicle so that the loading and unloading zone may be employed for other purposes.

It is an object of the present invention to provide a foldable walkway which may be stowed in a minimum stowage area without engaging or otherwise connecting the underside of the walkway with the top surface of the walkway.

Another object of the present invention is to provide a portable walkway having rigid stanchions which may be folded into a relatively compact area.

Still a further object of the invention is to provide a storage cart for such a portable walkway adaptable to automatically collect or lay out the walkway, including rigid stanchions, with a minimum of physical effort.

Another object of the present invention is to provide suitable mechanism on a storage cart for automatically folding or unfolding such a walkway, which mechanism is free from moving parts to alleviate any necessity for extensive maintenance or repairs. A feature resides in the fact that the folding or unfolding actions can be achieved by relatively unskilled personnel and without extensive training in equipment handling.

Still another object of the present invention is to provide a storage cart for a walkway which may readily pick up or lay out the walkway over an uneven or sloping pavement or terrain.

These and other objects of this invention not specifically set forth above will be readily apparent from the following description with reference to the accompanying drawings, wherein:

FIGURE 9 is an enlarged sectional view of the lower roller means taken in the direction of arrows 9—9 of FIGURE 7;

Figures 1, 3, 4:
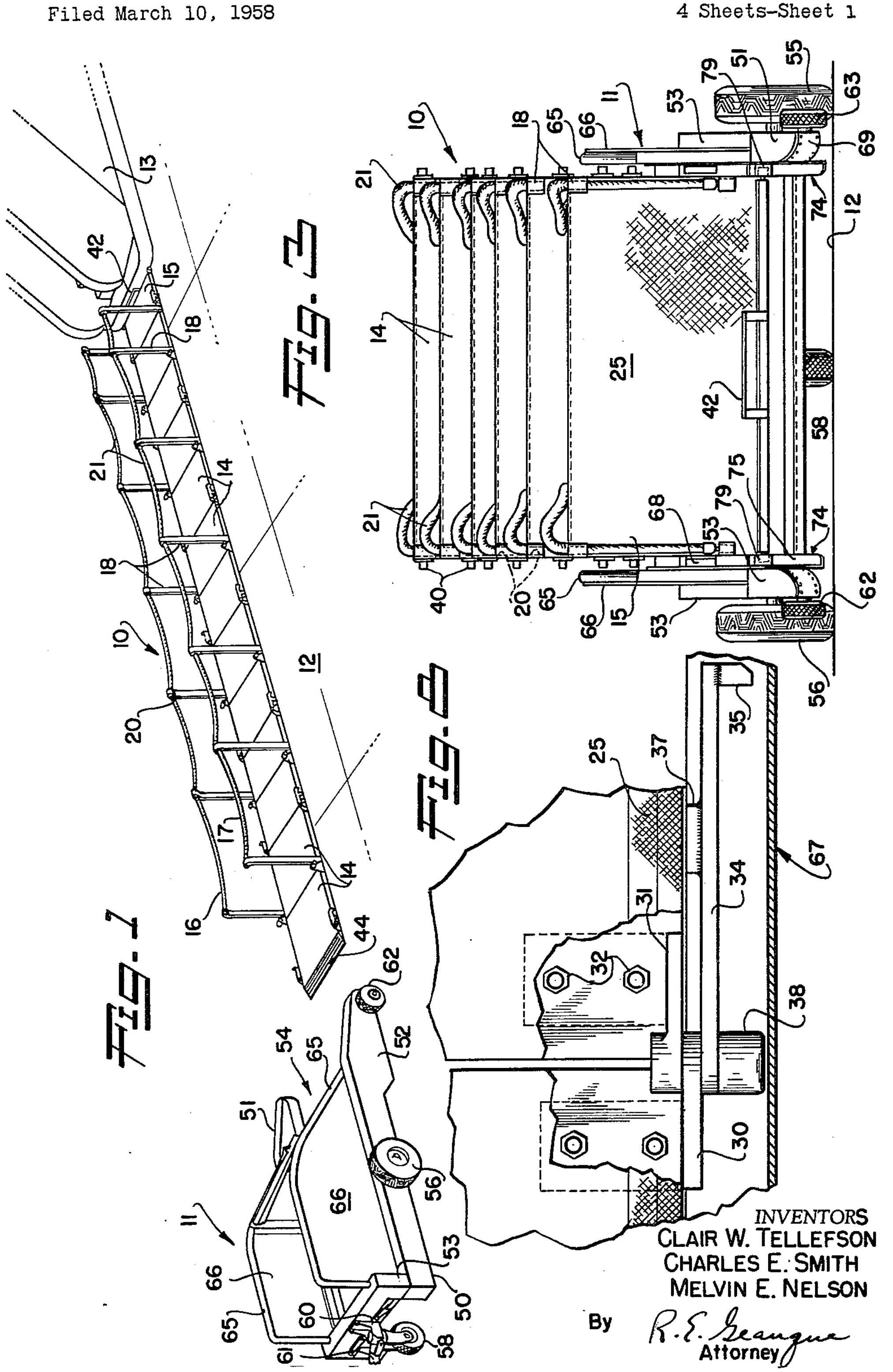
FIGURE 1 is a perspective drawing of a portable walkway and storage cart therefor in accordance with the present invention.
FIGURE 3 is a front elevational view of the storage cart with the walkway in its stowed position.
FIGURE 4 is a perspective drawing of the storage cart showing the walkway partially extended.

With reference to FIGURE 1, the present invention is shown in the form of a portable walkway and a storage cart indicated by the general reference numerals 10 and 11, respectively. The walkway 10 is shown in its fully extended position laid out over a pavement or terrain 12 and leading directly to a conventional passenger loading and unloading stairway 13. Stairway 13 may be of any suitable configuration but in the present instance, the configuration greatly resembles an aircraft stairway which is available at many commercial airports. It is to be understood that the stairway does not form any part of the present invention.

The walkway 10 comprises in general a plurality of panels, such as panel 14, which are arranged in pairs in an end-to-end relationship in their laid out or extended position. Each pair of panels is of a different length than adjacent pairs of panels arranged with the longest panel 14 serving as the initial panel to be picked up by the storage cart and as the last panel to be laid out when the walkway is extended. The remaining panels extending from panel 14 progressively decrease in length to a last panel 15, which is the shortest panel in length of the plurality. The difference in panel length is more clearly shown in FIGURES 2 and 3.

Walkway 10 is provided with a pair of parallel guide means 16 and 17 which include a plurality of rigid stanchions, such as a stanchion 18, which are arranged on opposite sides of the panels to form a pair of parallel rows and which are secured to their respective panels by any suitable means, such as screws, bolts, or other fasteners. Regardless of the folded or extended position of the panels, the stanchions are rigid with respect to the panel on which they are attached and the stanchions extend outwardly from the panel at right angles to the top surface thereof. The end of each stanchion opposite to its end attached to the panel is provided with an aperture 20 through which a flexible railing 21 passes. In the present instance, a cord railing is employed which is covered with a protective plastic shield. One end of each railing 21, such as end 22, is fixed to the last stanchion in each row while its opposite end 23 is free to pass through the aperture of the first stanchion in each row. End 23 is furnished with an enlarged bead 24 so that end 23 cannot be pulled through the aperture in the stanchion.

The top or exposed surface of the plurality of panels in their extended position may be provided with a covering 25, such as carpeting or the like. Inasmuch as the appearance of the carpeting is important to the use of the walkway, the carpeted panels are foldably arranged so that the under side of the panel engageable with the pavement or ground, never comes in contact with or in engagement with the carpeting of adjacent panels when the walkway is in its folded or stored condition. This feature is largely achieved by pivotal attaching means connecting adjacent panels so that the entire walkway can be folded into a compact package arrangement. As shown in FIGURE 4, one pivoting arrangement 26 connects selected adjacent panels so that the under side of the panels face each other in the folded condition of the walkway. A second form of pivoting arrangement 27 is shown which causes selected adjacent panels to be pivoted in an opposite direction to the first mentioned pivoting arrangement so that the carpeted surface of adjacent panels face each other.

With respect to FIGURES 4, 7, 8 and 9, pivoting attachment means 27 comprises a pair of arms 30 and 31 which are connected on one end to the opposing end of selected adjacent panels along the edge of the panel by suitable fasteners, such as screws 32. The ends of the arms 30 and 31 opposite to the ends attached to the panels are loosely joined to each other by means of a suitable pivot pin or bolt 33 to form a pivot point.

Figures 2, 7, 8:
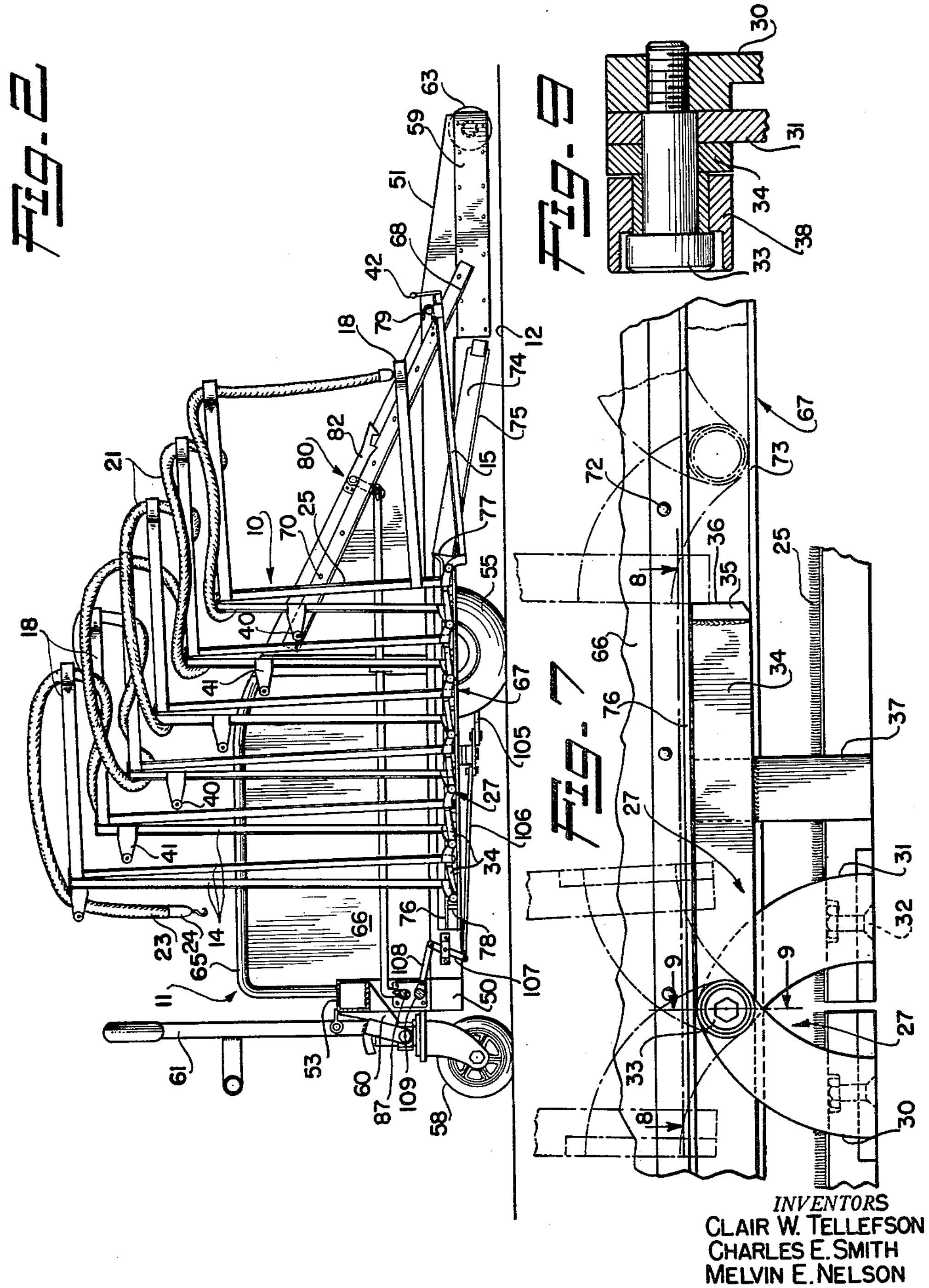
FIGURE 2 is a side cut-away view of the storage cart and walkway showing the walkway in its folded or stored position.
FIGURE 7 is an enlarged side view of a portion of walkway in its extended position as shown in solid lines and in its folded position shown in broken lines. Roller means are shown which engage with the lower track mechanism of the cart.
FIGURE 8 is a top view of the walkway and lower roller means taken in the direction of arrows 8—8 of FIGURE 7.

Some selected pivotal arrangements 27 are provided further with a spacer stop 34 which, as shown in FIGURE 2, is employed to prevent the carpeted surfaces of adjacent panels from coming into contact with each other when the walkway is in a folded condition. The spacer stop 34 is loosely carried by fastener 33 on one end of the stop. The end of the stop opposite to its connection on fastener 33 is provided with a flange 35 presenting a broad, flat face 36 which engages roller 38 of the next pair of panels to prevent any further folding. The spacer stop is provided further with a foot 37 which maintains the flange 35 at approximately the same height as fastener 33 above the ground or supporting surface therefor.

The pivoting arrangement means 27 includes a roller 38 which is rotatably carried on fastener 33. Inasmuch as the several pivoting arrangement means 27 are provided at spaced intervals along the parallel edges of the walkway, the rollers 38 provide a first roller means. The function of the first set of roller means will be described later.

A second roller means is provided at spaced intervals along the edges of the walkway which comprise a roller 40 rotatably mounted on a member 41 which is suitably attached to the edge of a panel by means, such as screws, for example. The length of member 41 is longer than the length of arms 30 and 31 so that the second set of roller means is located in a higher position above the pavement than the first set of roller means 38.

One end of the walkway is provided with a handle 42 and a pair of nubs 43 while the opposite end of the walkway is provided with a scuff plate 44.

Figures 5, 6:
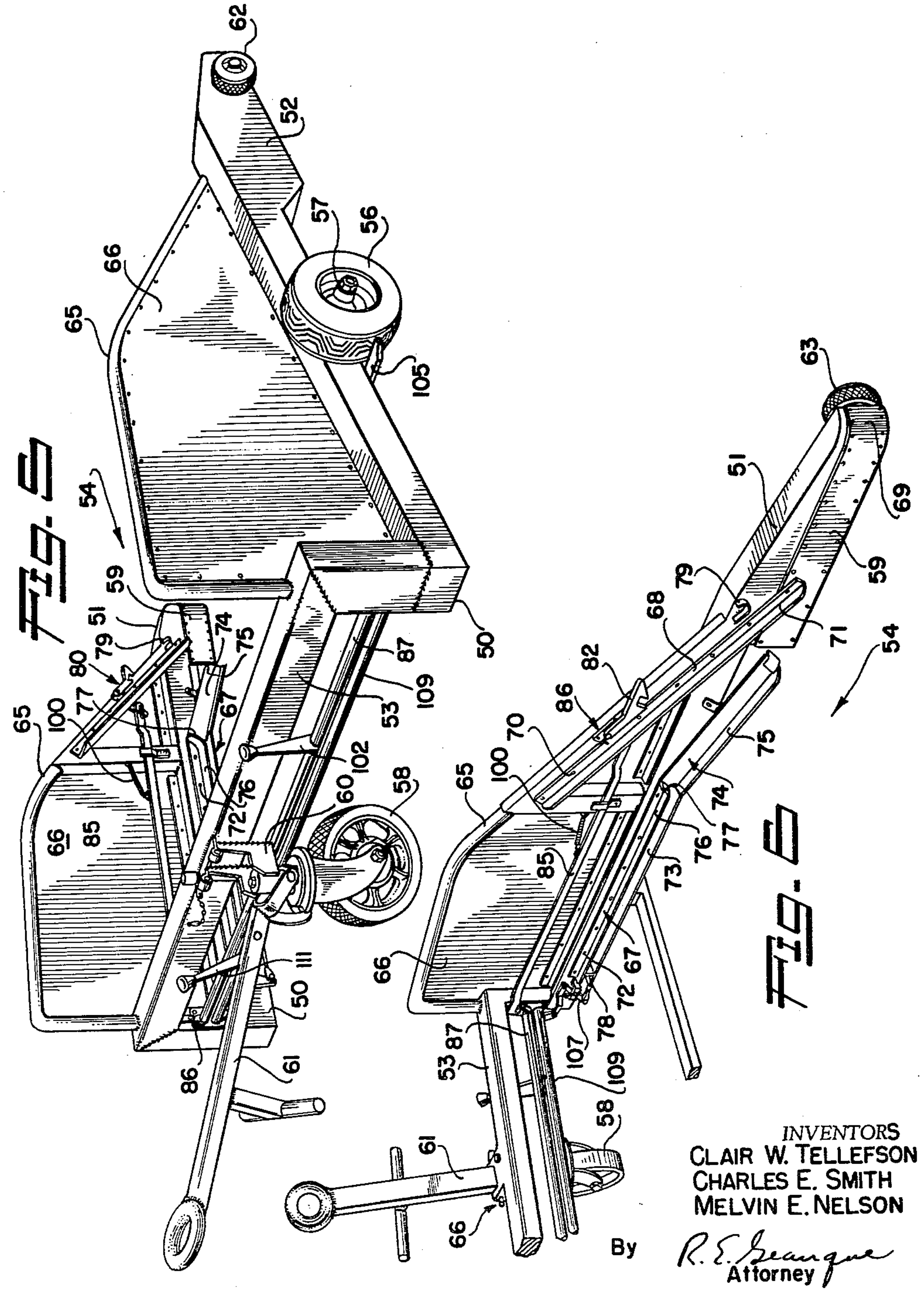
FIGURE 5 is a perspective drawing of the storage cart without the portable walkway.
FIGURE 6 is a cut-away perspective view of the storage cart of FIGURE 5 exposing the track mechanism.

With respect to FIGURES 1, 5 and 6, the storage cart 11 for the portable walkway 10 is shown which may be said to comprise, in general, a U-shaped chassis 50 having a pair of parallel side members 51 and 52 joined by a rear member 53 and having an open end 54 leading into a storage compartment area defined by the parallel side members. The chassis is primarily supported on the pavement or terrain 12 by a pair of pneumatic wheels 55 and 56, which are conventionally mounted to the bottom of the chassis by axle 57 and a rear wheel 58 which is pivotally mounted in a bracket 60 attached to rear member 53. A handle 61 is fastened to the wheel 58 so that the wheel may be easily pivoted by manual means in order to direct the travel of the cart. Rotatably mounted on the side members on the forward end of the cart is a pair of guide wheels 62 and 63 which are normally raised above the ground when the cart is supported on a flat pavement by wheels 55, 56 and 58. The guide wheels are off-set in this manner in order to compensate for any increase in pavement elevation so that the forward end of the cart will not bind or hang up thereon. This arrangement is more clearly shown in FIGURE 2.

Each of the side members of the chassis is provided with an upright frame 65 and a panel 66 which greatly defines the walkway storage area and which serves as supporting members for mounting a walkway pickup mechanism.

As shown in FIGURE 6, the pickup mechanism includes, in general, a lower track means 67 and an upper track means 68. The upper track means is attached to the frame 65 by a plurality of fasteners, such as screws, rivets or the like, and is provided with a flange 71 constituting a pickup track for engaging and guiding the second set of rollers 40. The lower track means 67 is attached to each side member by means of a plurality of fasteners 72 and includes a flange 73. A lower track means extension 74 is provided which is attached to each side member and includes a lower roller pickup track flange 75 which is arranged in an angular relationship leading to the flange track 73. The flange track 75 is employed for picking up and guiding the rollers 38 associated with pivoting arrangement 27. An upper flange element 76 is provided on the lower track means having a rounded surface 77 adjacent the mating of the track flange 73 with the track flange 75 of extension 74 so that the path of roller 38 travel may be easily diverted from the incline path of flange track 75 to the relatively horizontal track flange 73. Interposed between the upper flange 76 and the flange track 73 at the rear of the lower track means, there is provided a stop element 78 which stops the rearward direction of travel of the first roller 38 which is picked up by the lower track means.

A pair of hooks 79 are attached to the forward end of the parallel side members 51 and 52 which are employed to receive the nubs 43 carried on the end of panel 15 which is the last one of the plurality to be stored on the cart. Panel 15 is not pivoted to a substantially upright position as are the other panels but is merely manually raised from the pavement and supported on the hooks 79 via nubs 43. If desirable, a power means may be provided for lifting panel 15 onto its rest position on the cart.

The forward inside end of side members 51 and 52 is provided with guide plates 59 which aid the cart pick up operation in aligning the opening 54 and the side members with the sets of rollers. Should the operator mis-align the cart respective to the rollers, the rollers will engage rounded portion 69 of either guide plate and cause the forward end of the cart to re-align itself.

Figures 4, 10, 11, 12:
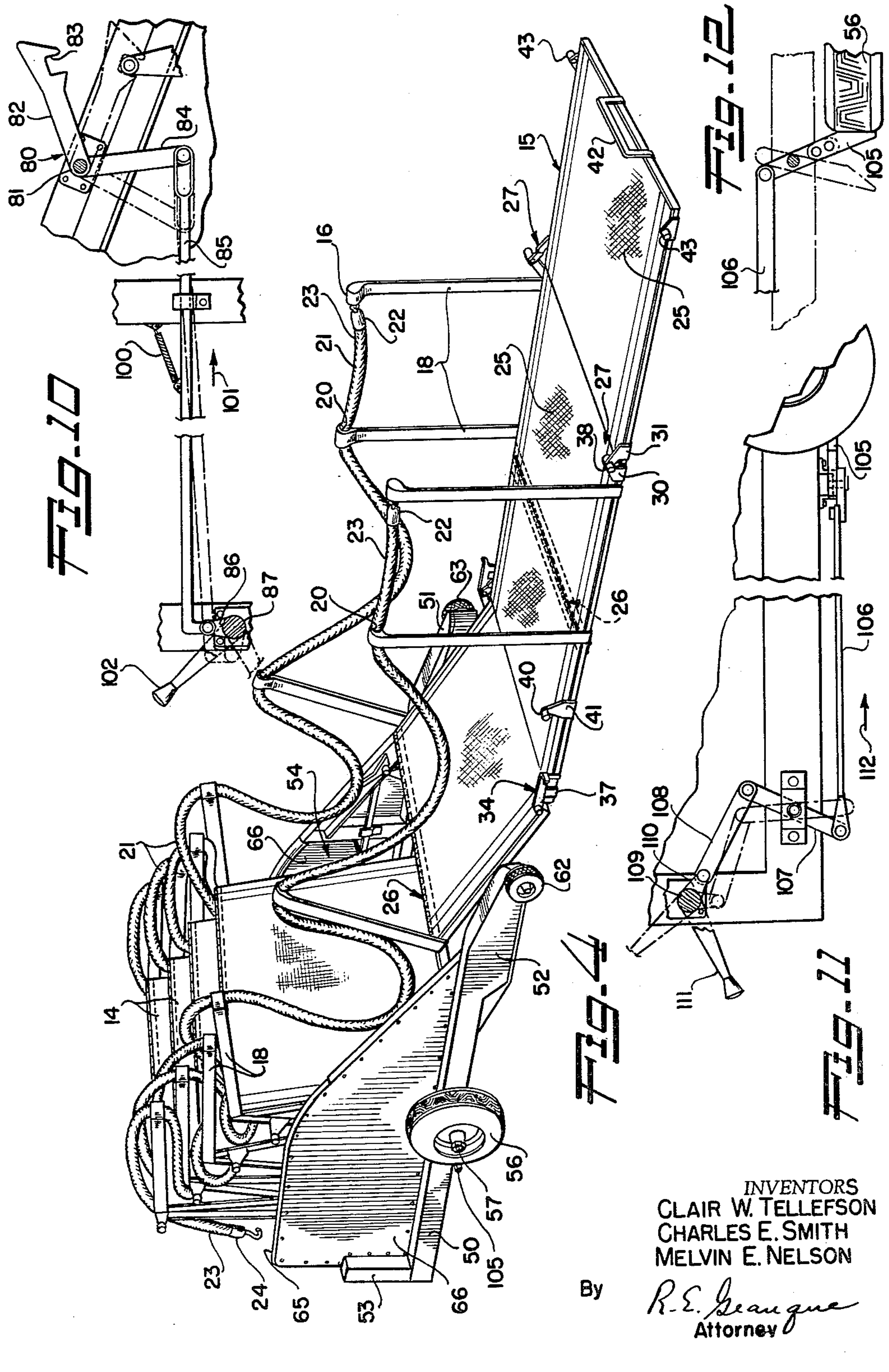
FIGURE 10 is a fragmentary view of a locking mechanism suitable for holding or retaining the walkway in a partially folded position.
FIGURE 11 is a fragmentary side view of the brake means or holding means for the storage cart.
FIGURE 12 is a top fragmentary view of a portion of the brake means shown in FIGURE 11.

It has been found desirable in some instances to hold the walkway in a partially folded position such as shown in FIGURE 4. Therefore, a latching mechanism is provided as shown in FIGURE 10 which comprises a pivotally mounted-bell crank 80 mounted on a pivot 81 having an arm 82 which is formed with a hook 83 on one end thereof. Bell crank 80 is also provided with an arm 84 which is pivotally connected to one end of a rod 85 that is rotatably connected on its opposite end to an element 86. Element 86, in turn, is fixed to a rotatable rod 87 suitably mounted between the parallel side members of the chassis. Rod 85 is connected to a portion of the frame 65 associated with side member 51 by means of a spring 100 which normally urges rod 85 in the direction of arrow 101, which in turn maintains the hook 83 out of the line of travel of roller 40 and as shown in solid lines in FIGURE 10. However, upon the rotation of rod 87 by manually operating a handle 102, the spring tension of spring 100 is overcome and hook 83 takes the position as shown in broken lines which is in interference with the path of travel of rollers 40 on the upper track means. Spring 100, rod 85, arm 86 and rod 87 form in combination a conventional over center toggle mechanism, which will maintain the latch mechanism in the position as shown in the broken lines. When it is desirable to release the hook 83 from a roller 40 it is necessary to actuate rod 85 by means of handle 102 in the direction opposite to arrow 101.

With reference to FIGURES 11 and 12, a brake mechanism is shown for the storage cart which comprises a wheel engagement member 105 which is pivotally mounted on the underside of the side members of the chassis and which is connected on one end to a rod 106. Rod 106 is moved rectilinearly by means of a pivotally mounted bell crank 107 pivotally attached at one end to rod 106 and pivotally attached at its other end to a link 108. Link 108, in turn, is connected to a rotatable rod 109 via an arm 110. A handle 111 attached to rod 109 may be manually actuated to move rod 106 in the direction of arrow 112, which positions the link and bell crank to the positions shown in broken line and causes member 105 to disengage the wheels.

During actual operation for unfolding the portable stairway 10 onto the pavement 12 from the cart, the cart 11 with the walkway folded within the storage area between the parallel side members 51 and 52 and their associated frame 65 and panel 66, is maneuvered to a location at which the walkway is to be laid. Generally, the cart is wheeled to a passenger stand 13 and the rear of the cart is pointed toward a passenger loading and unloading gate. The brake mechanism is actuated in order to prevent inadvertent mis-alignment of the cart while the panel 15 is lifted from its position of support on the hooks 79 and placed on the pavement. Panel 15 may then be easily lifted by means of handle 42 and the leading edge of the panel placed adjacent to passenger stand stairway. The brake is then released and the cart moved rearwardly away from panel 15 allowing the plurality of panel sections to unfold out of the storage area of the cart. Rollers 38 and 40 travel along a path dictated by the upper and lower track means which provide for an even unfolding of the plurality of panels including respective stanchions 18 and railings 21. When the walkway is completely unloaded, the cart may be moved clear of the area.

During an actual pickup operation, the cart 11 is maneuvered to the approach end of the extended walkway substantially as shown in FIGURE 1. The guide plates 59 located on the forward end of the pair of side members 51 and 52 are visually aligned by the cart operator with the edges of the first panel. The operator moves the cart forward so that the first set of rollers 38 of the series is picked up by the flange 75 of the lower track means extension 74. As the operator urges the cart forward the rollers 38 progress up the incline of flange 75 and are directed onto flange 73 of the lower track means by rounded surface 77 and upper flange 76. As the forward movement of the cart continues, flange 71 of the upper track means 68 comes into contact with the first set of upper rollers 40 which lifts the panel upward at an inclined angle to start the folding action. Inasmuch as the track flange 71 of the upper track means and the angle of flange 75 of the lower track means extension 74 are not parallel with respect to each other, the panel is progressively urged to an upright position by the time upper rollers 40 disengage with the upper track means. When the first set of lower rollers 38 stop at the end of the closed track by stop 78, continued forward movement of the cart folds the first two panels and the next set of lower rollers 38 enter the lower tracking means. At this time, the next set of lower rollers 38 are travelling along the lower track means and the same panel operation is repeated for each and every panel of the series. Continued cart movement picks up and folds all the panels except the last panel which is lifted into the supported hook 79. Once the last panel is hooked in place, the cart with the stored walkway can be moved to an equipment storage area.

After the first panel 14 is aligned and picked up, the cart will guide itself along the edges of the walkway throughout the remainder of the pickup operation. The spacer bars carried on the pivotal attaching means 27 serve to space the stored panels apart so that none of the panel surfaces which face each other will come into contact.

Various modifications may suggest themselves to those skilled in the art without departing from the spirit of the present invention, and hence the present invention is not restricted to the specific form shown or uses mentioned, except to the extent indicated in the appended claims.

What is claimed is:

1. Apparatus of the character described comprising, a foldable walkway of substantial length in its unfolded or extended position including a plurality of rigid panels of different lengths hingeably connected together in a continuous end-to-end fashion, the extended walkway having a continuous ground engaging and supporting surface on one side thereof and a continuous walking surface on the opposite side thereof, a plurality of rigid stanchions secured to the walkway forming a pair of parallel rows, flexible guide means connecting the stanchions formed in each row, alternate sets of high and low rollers secured to different panels of the walkway along its length, means independently carried on each panel for mounting the sets of high and low rollers on the edges of the walkway in fixed spaced relationship with respect to each other and projected above the walking surface of the walkway, a cart having a storage compartment opening through one side thereof for collecting, storing and dispensing the walkway including the stanchions, and track means arranged in outward divergent spaced relationship extending away from the opening of the cart carried on the cart slidably engageable with the sets of high and low rollers alternately for selectively folding and unfolding the walkway including the rows of stanchions on the cart.

2. Apparatus of the character described comprising, a foldable walkway of substantial length in its unfolded or extended position including a plurality of rigid panels of different lengths hingeably connected together in a continuous end-to-end fashion, the extended walkway having a continuous ground engaging and supporting surface on one side thereof and a continuous walking surface on the opposite side thereof, a plurality of rigid stanchions secured to the opposite edges of the walkway projecting upright in perpendicular to the walking surface and forming a pair of parallel rows, flexible guide means connecting the stanchions forming each row, alternate sets of high and low rollers secured to different panels of the walkway along its length, means independently carried on each panel for mounting the sets of high and low rollers on the edges of the walkway projected above the walking surface when the walkway is extended and maintained in fixed spaced relationship with respect to each other and the walking surface of the walkway, a cart having a storage compartment opening through one side thereof for collecting, storing and dispensing the walkway including the stanchions, divergent track means carried on the cart diverging outwardly away from the opening of the cart slidable engageable with the sets of high and low rollers alternately for selectively folding and unfolding the walkway including the rows of stanchions on the cart.

3. Apparatus of the character described comprising, a foldable walkway having a walking surface and an under-surface including a plurality of rigid panels arranged in a continuous and unbroken end-to-end relationship, hinge means connecting adjacent panel ends together for relative pivotal movement, alternate sets of high and low rollers secured to different panels on opposite sides of each panel of the walkway and projected above the walking surface, a cart for storing the walkway having a storage area opening through one side thereof, a pair of tracks arranged in divergent spaced relationship and carried on the cart diverging outwardly away from the cart opening slidably engageable with the sets of high and low rollers alternately for selectively folding and unfolding the walkway on the cart, the pair of tracks and the sets of rollers co-operating to fold the panels so that the walking surface of adjacent panels face each other when the walkway is folded on the cart.

4. Apparatus of the character described comprising, a wheeled cart supported on the ground having a storage compartment opening through one side thereof, divergent spaced trackways secured to the inner side of the storage compartment extending away from the opening thereto having initial roller engaging portions adjacent the compartment opening above the cart supporting surface, a series of walkway panels hinged together in a continuous end-to-end relationship and having a bottom side laying on the cart supporting surface, sets of high and low spaced rollers secured to different alternate panels, each set secured to opposite sides of each panel, the roller engaging portions of the trackways cooperate with the spaced rollers to pick up and fold the walkway panels.

5. Apparatus of the character described comprising, a wheeled cart having a pair of opposed side walls and a rear wall connected between the side walls to define a storage area of general U shape configuration having an open end leading into the area, a pair of spaced divergent trackways secured to each side wall within the storage area extending outwardly away from the storage area open end above the surface on which the cart is supported, a series of walkway panels hinged together in a continuous end-to-end relationship and laying on said surface, sets of high and low spaced rollers secured to different alternate panels, each set secured to opposite sides of each panel engageable with the trackways and cooperating therewith to pick up and fold the series of walkway panels.

References Cited in the file of this patent

UNITED STATES PATENTS

| | | |
|---|---|---|
| 430,935 | Edwards | June 24, 1890 |
| 713,561 | Doyen | Nov. 11, 1902 |
| 960,022 | Kelemen et al. | May 31, 1910 |
| 2,344,772 | Heidenreich | Mar. 21, 1944 |
| 2,700,169 | Henion | Jan. 25, 1955 |
| 2,771,136 | Lecomte | Nov. 20, 1956 |

FOREIGN PATENTS

| | | |
|---|---|---|
| 49,916 | Austria | Sept. 25, 1911 |
| 785,137 | France | May 13, 1935 |